United States Patent
Vijayaraghavan et al.

(10) Patent No.: US 7,684,477 B1
(45) Date of Patent: Mar. 23, 2010

(54) MULTI-PROTOCOL LOW LATENCY AUTOMATIC SPEED NEGOTIATION ARCHITECTURE FOR AN EMBEDDED HIGH SPEED SERIAL INTERFACE IN A PROGRAMMABLE LOGIC DEVICE

(75) Inventors: Divya Vijayaraghavan, Mountain View, CA (US); Chong H. Lee, San Ramon, CA (US)

(73) Assignee: Altera Corporation, San Jose, CA (US)

( * ) Notice: Subject to any disclaimer, the term of this patent is extended or adjusted under 35 U.S.C. 154(b) by 916 days.

(21) Appl. No.: 11/490,406

(22) Filed: Jul. 19, 2006

Related U.S. Application Data

(60) Provisional application No. 60/751,860, filed on Dec. 20, 2005.

(51) Int. Cl.
*H04B 3/46* (2006.01)

(52) U.S. Cl. .................................................. 375/225
(58) Field of Classification Search ................. 375/219, 375/220, 222, 224, 225, 227; 370/241, 253; 455/9, 39, 500, 67.11, 67.13, 67.14, 73
See application file for complete search history.

(56) References Cited

U.S. PATENT DOCUMENTS

| | | | |
|---|---|---|---|
| 6,798,869 B1 * | 9/2004 | Sidhu et al. | 379/93.33 |
| 2004/0022306 A1 * | 2/2004 | Baumgartner | 375/220 |
| 2005/0058290 A1 * | 3/2005 | Kryzak et al. | 380/268 |
| 2006/0053244 A1 * | 3/2006 | Fruhauf et al. | 710/313 |
| 2006/0067389 A1 * | 3/2006 | Tounai et al. | 375/219 |
| 2007/0005831 A1 * | 1/2007 | Gregorius | 710/52 |

* cited by examiner

*Primary Examiner*—Young T. Tse
(74) *Attorney, Agent, or Firm*—Ropes & Gray LLP; Jeffrey H. Ingerman

(57) ABSTRACT

A serial interface for a programmable logic device includes receiver and transmitter portions, and an automatic speed negotiation module to adjust the data rates of both portions. The speed adjustment may be accomplished by adjusting the widths of the data paths in both portions. The speed adjustment occurs on receipt of a control signal generated elsewhere on the programmable logic device, or generated by the module. One reason for generating the control signal is the detection of data errors in the received data, or the detection of a delimiter pattern in the received data signifying that a remote device is about to change its data rate.

Similarly, before changing its data rate, the module may insert a delimiter in the data in the transmitter portion. After receipt or transmission of a delimiter pattern, the module may wait for a predetermined delay period to elapse before changing the data rate.

21 Claims, 5 Drawing Sheets ously, such negotiation has been carried out in software or in the programmable logic core of the programmable logic device, outside of the serial interface itself.

MULTI-PROTOCOL LOW LATENCY AUTOMATIC SPEED NEGOTIATION ARCHITECTURE FOR AN EMBEDDED HIGH SPEED SERIAL INTERFACE IN A PROGRAMMABLE LOGIC DEVICE

CROSS REFERENCE TO RELATED APPLICATION

This claims the benefit of copending, commonly-assigned U.S. Provisional Patent Application No. 60/751,860, filed Dec. 20, 2005, which is hereby incorporated by reference herein in its entirety.

BACKGROUND OF THE INVENTION

This invention relates to a high-speed serial interface, especially in a programmable logic device (PLD), which may operate at different data rates.

It has become common for PLDs to incorporate high-speed serial interfaces to accommodate high-speed (i.e., greater than 1 Gbps) serial I/O standards—e.g., the XAUI (Extended Attachment Unit Interface) standard. In accordance with the XAUI standard for example, a high-speed serial interface includes transceiver groups known as "quads," each of which includes four transceivers and some central logic.

In one implementation, each transceiver is divided into a physical medium attachment (PMA) portion or module which communicates with outside devices, and a physical coding sublayer (PCS) portion or module which performs serial processing of data, for transmission to, or that is received from, those outside devices.

Even when operating under identical standards, a particular serial interface may operate at different speeds, depending, for example, on line conditions. Thus, it is known for the PCS of a serial interface to negotiate with its counterpart for the highest speed that will support reliable transmission and reception at both ends. Heretofore, however, such negotiation has been carried out in software or in the programmable logic core of the programmable logic device, outside of the serial interface itself.

Newer emerging serial protocols, such as PCI Express Generation 2 ("PCIe2"), 4 Gbps Fibre Channel ("4GFC") and 8 Gbps Fibre Channel ("8GFC"), have short speed negotiation windows. These windows generally are too short for the relatively slow software or programmable logic.

It would be desirable to be able to provide faster (i.e., lower latency) speed negotiation in the PCS of a serial interface in a programmable logic device.

SUMMARY OF THE INVENTION

The present invention provides a high-speed serial interface of the type described, in a PLD, with a built-in hardware module for automatic speed negotiation.

The automatic speed negotiation preferably converges within a limited time interval at the highest possible speed at which a device can establish a valid connection with another device to maximize performance. Preferably, a device can start at either the highest or lowest possible data rate and step either downward or upward, respectively, to converge to the highest speed reliably supported by both devices and their interconnection mechanism. Under the PCIe2 protocol, the device preferably starts at a low rate end steps up until it finds the fastest reliable speed, while under the 4GFC and 8GFC protocols, the device preferably starts at a high rate and steps down to the fastest reliable speed.

When the device starts at a high rate and steps down (e.g., under the 4GFC or 8GFC protocol), the connection is checked at each step. If no error is detected at a particular step, the rate remains unchanged. If error is detected at a particular step, then the rate is stepped down again. This continues until a rate is reached at which no error is detected.

When the device starts at a low rate and steps up (e.g., under the PCIe2 protocol), the connection also is checked at each step. However, because each step is being approached from a lower rate, the lack of error at a particular step is not conclusive evidence that the maximum possible rate has been reached. Therefore, as long as no error is detected, the rate is increased by another step (in accordance with the protocol), until a rate is reached at which error is detected. This is an indication that the rate has become too high, and so, as above in the case where the device starts high, the rate is decreased in steps until a rate is reached at which no error is detected. Because the rate has been increased from lower rates until error was detected, normally once the decrease of the rate has begun, the rate will have to be decreased by only one step unless conditions have changed in the interim.

Depending on the particular implementation, before a rate change is effected, a delimiter pattern may be inserted into the data stream to let the other device know that a rate change is imminent. Other parameters may be exchanged to indicate the direction and magnitude of the rate change.

In a preferred embodiment, once the initial best rate is established by one of the two methods just described, the rate will decrease on detection of error. Preferably, however, there are also periodic attempts to raise the rate.

In accordance with the invention, the automatic negotiation process is accelerated by providing hardware, preferably in the PCS portion of the transceiver, to perform at least a part of the negotiation process. In a preferred embodiment, there is one such hardware module per channel—i.e., per PCS transmitter/receiver pair. On detection of a rate change requirement, as discussed below, the automatic speed negotiation module changes the channel speed, preferably by changing the width of the data path.

In one embodiment, indication of a rate change requirement may be provided from outside the PCS. For example, the indication could be initiated completely outside the transceiver by logic elsewhere on the PLD, such as in the programmable logic portion of the PLD. In another embodiment, the automatic speed negotiation module may include circuitry for determining on its own whether or not a rate change is required. For example, the module may include a bit-error-rate monitor to monitor the received data (it being apparent that errors in the transmitted data resulting from too high a channel speed will occur only after data leaves the transmitter, so that such errors would not be detectable by the transceiver).

As stated above, when a rate change is imminent, the protocol in question may require that a delimiter pattern be inserted into the data stream, which must be answered with a similar delimiter pattern before implementation of the rate change. Therefore, in a preferred embodiment, the automatic speed negotiation module preferably includes a delimiter pattern generator to allow it to insert the delimiter pattern into the transmit path. Preferably, the module also includes delimiter pattern recognition circuitry, which may include a delimiter pattern generator and a comparator that compares data in the receive path to the generated delimiter pattern.

Thus, if the automatic speed negotiation module initiates a rate change, whether because it receives a rate change signal or command from the PLD logic core or because its own bit-error-rate monitor indicates the need for a rate change, it can insert the rate change delimiter pattern in the transmitted data, which will be detected by the remote device so that the remote device can react accordingly (e.g., by changing its own rate). Similarly, if the automatic speed negotiation module detects the rate change delimiter pattern in the received data, it can react accordingly (e.g., by changing its own rate).

Under current protocols, the rate change occurs simultaneously at both ends, after a delimiting pattern has been transmitted and received at each end. This means that if a receiver at one end receives a delimiting pattern after the transmitter at that end has sent a delimiting pattern of its own, then the rate change process can begin at that end. It will also begin at the other end, which will have both received and sent the delimiting pattern. On the other hand, if the receiver at one end receives a delimiting pattern and the transmitter at that end has not sent a delimiting pattern, then the other end is initiating the request for a rate change and the transmitter at the one end has to send a delimiting pattern back to the other end before the rate change begins at that one end (which will now have both received and transmitted the delimiting pattern). Under the protocols, the transmitters at both ends are tri-stated during the rate-change period for a predetermined duration. A timer preferably is provided in the PCS to time the tristate period.

Thus, in accordance with the present invention there is provided a serial interface for use in a programmable logic device. The serial interface includes a transmitter portion programmably configurable to a plurality of data rates, a receiver portion programmably configurable to that plurality of data rates, and an automatic speed negotiation module operatively connected to the transmitter portion and the receiver portion to configure the transmitter portion and the receiver portion for communication with a remote device at a single data rate that is a best available one of the plurality of data rates.

A programmable logic device incorporating the serial interface is also provided.

BRIEF DESCRIPTION OF THE DRAWINGS

The above and other advantages of the invention will be apparent upon consideration of the following detailed description, taken in conjunction with the accompanying drawings, in which like reference characters refer to like parts throughout, and in which.

DETAILED DESCRIPTION OF THE INVENTION

As described above, the present invention provides a high-speed serial interface that incorporates a hardware automatic speed negotiation module that allows negotiation of the data rate on a serial interface channel to occur within the short time windows provided by newer serial interface protocols.

The invention will now be described with reference to FIGS. 1-4.

Figure 1:
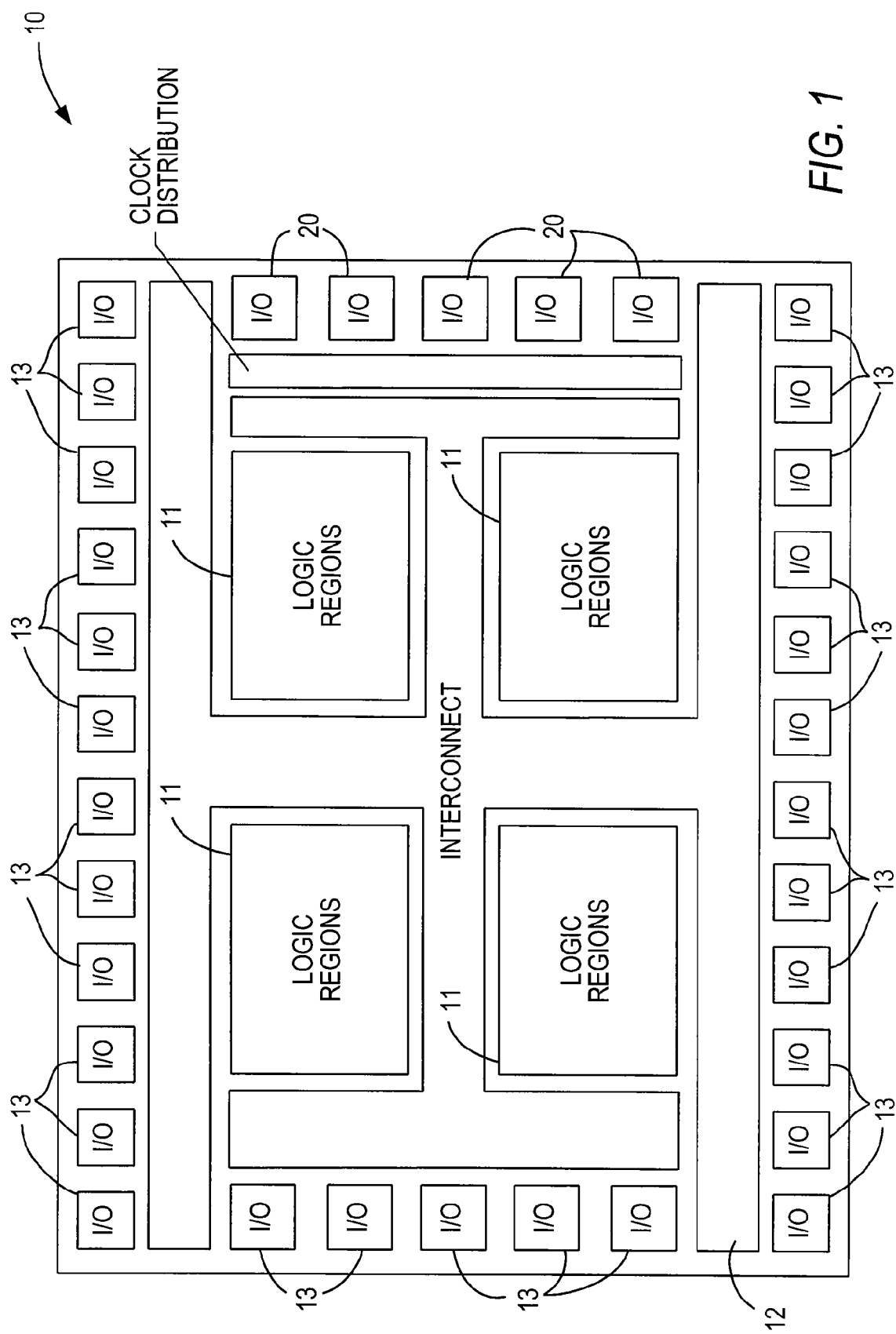
FIG. 1 is a block diagram of a preferred embodiment of a programmable logic device in which the present invention can be used.

PLD 10, shown schematically in FIG. 1, is one example of a device including a serial interface 20 incorporating the invention. PLD 10 has a programmable logic core including programmable logic regions 11 accessible to programmable interconnect structure 12. The layout of regions 11 and interconnect structure 12 as shown in FIG. 1 is intended to be schematic only, as many actual arrangements are known to, or may be created by, those of ordinary skill in the art.

PLD 10 also includes a plurality of other input/output ("I/O") regions 13. I/O regions 13 preferably are programmable, allowing the selection of one of a number of possible I/O signaling schemes, which may include differential and/or non-differential signaling schemes. Alternatively, I/O regions 13 may be fixed, each allowing only a particular signaling scheme. In some embodiments, a number of different types of fixed I/O regions 13 may be provided, so that while an individual region 13 does not allow a selection of signaling schemes, nevertheless PLD 10 as a whole does allow such a selection.

Figure 2:
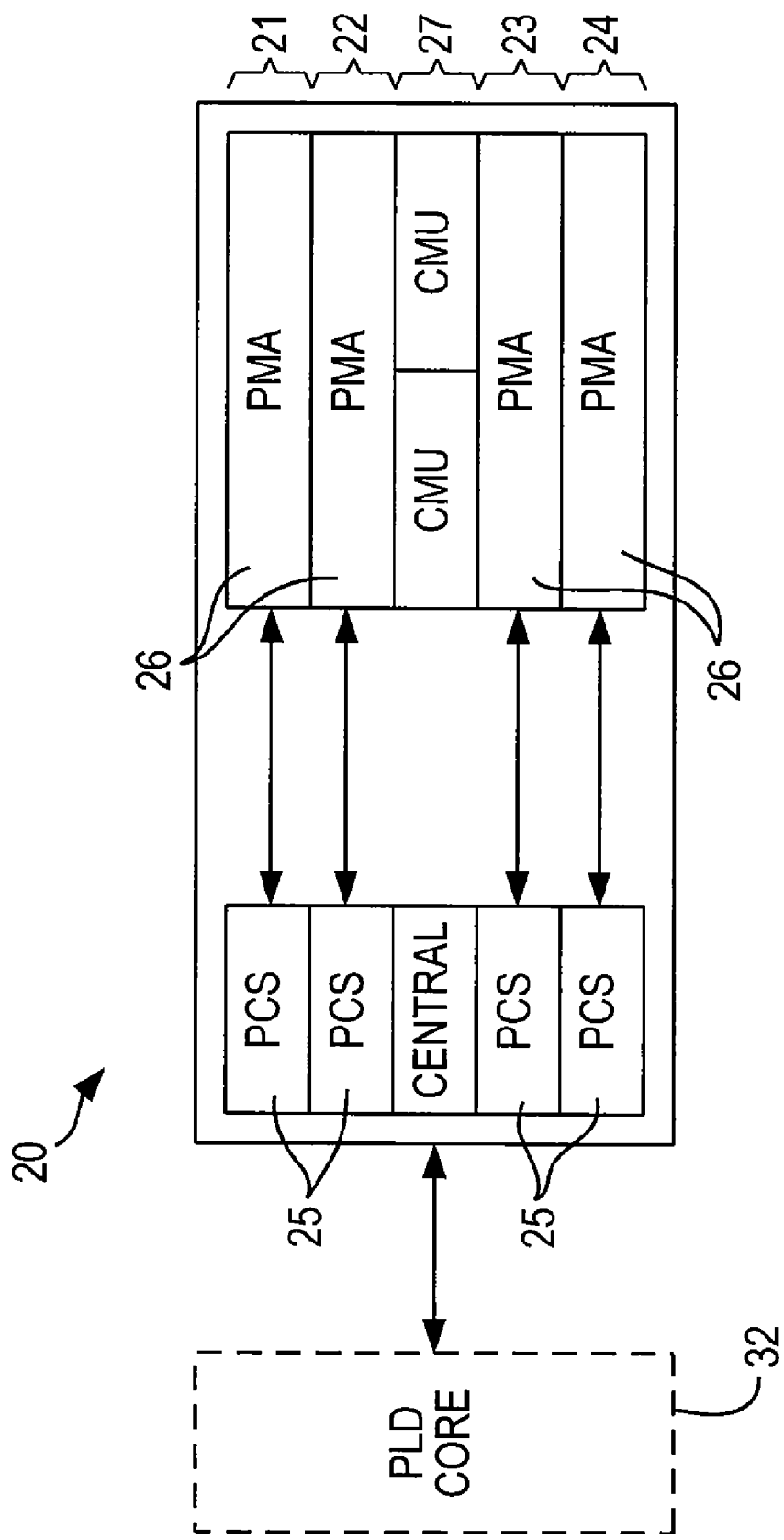
FIG. 2 is a schematic diagram of a serial interface in which the present invention may be incorporated.

For example, as shown in FIG. 2, each I/O region 20 preferably is a high-speed serial interface as described above, preferably including four channels 21-24, each including its own PCS module 25 and PMA module 26. Central logic 27 preferably is shared by channels 21-24.

Figure 3:
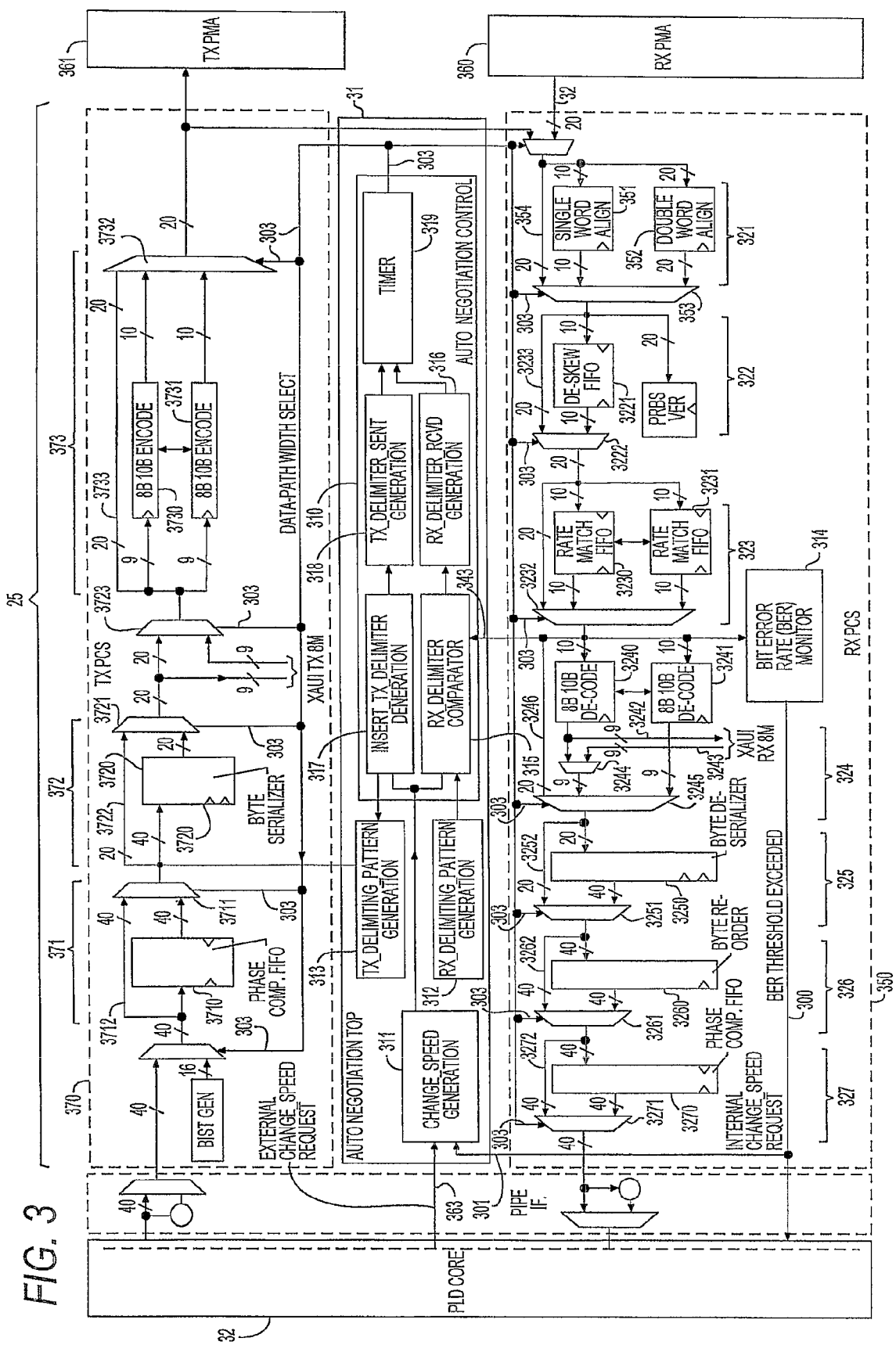
FIG. 3 is a schematic diagram of a preferred embodiment of one channel of a serial interface in accordance with the present invention.

FIG. 3 shows the details of one channel 30 which may be any of channels 21-24, and which preferably includes automatic speed negotiation module 31.

Preferably, PCS module 25 includes PCS receiver portion 350 and PCS transmitter portion 370. Receiver portion 350 preferably receives up to twenty bits on bus 32 from receiver PMA portion 360. PCS receiver portion 350 preferably includes a word or byte alignment stage 321 including single word align circuit 351, double word alignment circuit 352, and multiplexer 353 which allows selection of bypass conductor 354 or one of word alignment circuits 351, 352, under user control or under control of automatic speed negotiation module 31.

Next, at the output of multiplexer 353, PCS receiver portion 350 preferably includes deskew stage 322 including deskew FIFO circuit 3221 and multiplexer 3222 which allows selection of bypass conductor 3223, under user control or under control of automatic speed negotiation module 31. In the embodiment shown, the output of multiplexer 353 is twenty bits wide, as is bypass conductor 3223, while deskew FIFO 3221 is ten bits wide.

Next, at the output of multiplexer 3222, PCS receiver portion 350 preferably includes rate match stage 323 including two rate matching FIFO circuits 3230, 3231, and multiplexer 3232 which allows user-controlled selection of bypass conductor 3233 or the outputs of one or both of rate matching FIFO circuits 3230, 3231. Thus in a case of twenty-bit-wide data, the data can bypass the rate matching stage 323 or be processed by the two rate matching FIFOs 3230, 3231, while in the case of ten-bit-wide data, the data can bypass the rate matching stage 323 or be processed by one of the two rate matching FIFOs 3230, 3231.

Next, at the output of multiplexer 3232, PCS receiver portion 350 preferably includes padded protocol decoding stage 324 including two padded protocol decoders 3240, 3241 (in the illustration, two 8B/10B decoders). The output of one decoder 3240 preferably can be diverted at 3242 to additional XAUI circuitry (not shown, but preferably located in central channel 27) whence it returns at 3243 to XAUI-mode selection multiplexer 3244 which allows selection of either the raw output of decoder 3240 or the output of the additional XAUI circuitry. A multiplexer 3245 preferably allows selection of bypass conductor 3246, or one or both of XAUI-mode selection multiplexer 3244 and decoder 3241.

Next, at the output of multiplexer 3245, PCS receiver portion 350 preferably includes byte deserializer stage 325 including byte deserializer circuit 3250, as well as multiplexer 3251 allowing selection of bypass conductor 3252 or the output of byte deserializer circuit 3250.

Next, at the output of multiplexer 3251, PCS receiver portion 350 preferably includes byte reorder stage 326 including byte reorder circuit 3260, as well as multiplexer 3261 allowing selection of bypass conductor 3262 or the output of byte reorder circuit 3260.

Next, at the output of multiplexer 3261, PCS receiver portion 350 preferably includes phase compensation stage 327 including phase compensation FIFO circuit 3270, as well as multiplexer 3271 allowing selection of bypass conductor 3272 or the output of phase compensation FIFO 3270.

PCS transmitter portion 370 preferably includes a phase compensation stage 371 including phase compensation FIFO circuit 3710, as well as multiplexer 3711 allowing selection of bypass conductor 3712 or the output of phase compensation FIFO 3710.

Next, at the output of multiplexer 3711, PCS transmitter portion 370 preferably includes a byte serialization stage 372 including byte serializer 3720, as well as multiplexer 3721 allowing selection of bypass conductor 3722 or the output of byte serializer 3720. At the output of multiplexer 3721 is an additional XAUI-mode selection multiplexer 3723, which allows the selection of the output of multiplexer 3721 or that same output after diversion to additional XAUI circuitry (not shown) in XAUI mode.

Next, at the output of multiplexer 3723, PCS transmitter portion 370 preferably includes a padded-protocol encoding stage 373 including two padded protocol encoders 3730, 3731 (in the illustration, two 8B/10B encoders). A multiplexer 3732 preferably allows selection of bypass conductor 3733, or one or both of encoders 3730, 3731, as the output of PCS transmitter portion 370 to PMA transmitter portion 361.

PCS module 25 preferably also includes automatic speed negotiation module 31 in accordance with the invention, which in turn preferably includes rate-change signal generator 311, receive-rate delimiter generator 312, transmit-rate delimiter generator 313, bit-error-rate monitor 314 (shown outside module 31 but considered a component thereof), and automatic speed negotiation controller 310. Automatic speed negotiation controller 310 preferably includes receive-rate delimiter comparator 315, receive-rate delimiter reception signal generator 316, transmit-rate delimiter insertion unit 317, transmit-rate delimiter transmission signal generator 318, and timer 319.

Automatic speed negotiation module 31 may need to change the data rate because an error is detected in received data, or because PLD logic core 32 or some other portion of the PLD external to the transceiver, operating in accordance with the relevant protocol, issues a rate-change signal (up or down), or because a remote device has changed its data rate (whether because the remote device detected an error or for another reason) and included a rate-change delimiter pattern in data received by PCS receiver portion 350. If the error is detected in the received data, it may be detected by bit-error-rate monitor 314, which sends an indication via line 300 to PLD logic core 32, or via line 301 directly to rate-change signal generator 311. If the indication is sent to PLD logic core 32, logic core 32 will process the indication and send a signal via line 302 to rate-change signal generator 311. Either way, rate-change signal generator 311 will generate a rate-change signal and send it to automatic speed negotiation controller 310.

Automatic speed negotiation controller 310 would then change the data rate. Preferably, the method of changing the data rate would be to generate and issue a signal on lines 303, causing the various multiplexers discussed above and indicated in the drawing to select a narrower or wider data path, which has the effect, respectively, of reducing or increasing the serial data rate (it being understood that if the data is processed on a narrower data path at the same system clock speed, then the amount of data processed per unit time will decrease, which in turn will decrease the data rate needed to transmit that data serially, and similarly that a wider data path will result in an increased data rate). In the embodiment shown in FIG. 3, there are only two data path widths and therefore only two data rates available, but in other embodiments, the number of available data rates could be greater. In addition, the mechanism for data rate change could be different.

As discussed above, the protocols involved may expect or at least allow the insertion of a rate-change delimiter pattern in the data when a rate-change is imminent, so that the remote device can prepare for the rate change. Thus, in the embodiment of FIG. 3, receive-rate delimiter generator 312 and transmit-rate delimiter generator 313 generate those delimiter signals. Because each transceiver would be expected to be able to communicate with each other transceiver, normally one would expect the receive-rate delimiter pattern and the transmit-rate delimiter pattern to be the same, so that one delimiter generator should be sufficient. However, there may be cases where the receive-rate delimiter pattern and transmit-rate delimiter pattern are different, so preferably, for maximum flexibility both receive-rate delimiter generator 312 and transmit-rate delimiter generator 313 are provided.

Thus, if an error signal is generated by bit-error-rate monitor 314 or a rate-change signal is generated by core 32, resulting in a data rate change, then preferably when rate-change signal generator 311 sends the resulting rate-change command to automatic speed negotiation controller 310, it causes transmit-rate delimiter insertion unit 317 to instruct transmit-rate delimiter generator 313 to insert the transmit-rate delimiter pattern into the transmitted data stream via line 333.

In addition, transmit-rate delimiter insertion unit 317 preferably causes transmit-rate delimiter transmission signal generator 318 to send a signal to timer 319 indicating that the transmit-rate delimiter pattern has been transmitted, so that timer 319 begins counting down the delay period, discussed above, during which transmission of data is inhibited (preferably by tristating the transmitter), while the control signal is sent on lines 303 to change the rate.

Similarly, if a delimiter signal is received, it can be detected at 343 by receive-rate delimiter comparator 315, which preferably continually compares the received data at 343 to the delimiter pattern generated by receive-rate delimiter generator 312. Receive-rate delimiter comparator 315 preferably causes receive-rate delimiter reception signal generator 316 to send a signal to timer 319 indicating that the receive-rate delimiter pattern has been received, so that timer 319 begins counting down the delay period, discussed above, during which transmission of data is inhibited (preferably by tristating the transmitter), while the control signal is sent on lines 303 to change the rate.

Under current protocols such as PCIe2, 4GFC and 8GFC, it is contemplated that before the rate on a channel can change, preferably both the transceiver at the end instigating the change and the transceiver at the other end must send and receive a delimiting pattern, and then preferably waits for the delay period timed by timer 319 to elapse. Thus, the instigating end preferably sends a delimiter pattern and receives a delimiter pattern and then preferably waits for the delay period to elapse. Similarly, the non-instigating end preferably receives a delimiter pattern and sends a delimiter pattern and then preferably waits for the delay period timed by timer 319 to elapse.

However, there may be other protocols or modes of operation under which, during operations within the present invention, timer 319 is optional. In such embodiments, the rate may change as soon as both ends have both sent and received a delimiter pattern. Similarly, there may be other protocols or modes of operation under which the use of a pair of delimiter signals may be optional, and the rate change could be initiated following transmission of a delimiter pattern by the instigating end followed by the elapse of the delay period (the instigating end would begin timing the delay on transmission of the delimiter pattern, while the non-instigating end would begin timing the delay on receipt of the delimiter pattern). It is even conceivable that in some embodiments, the instigating end would change its rate immediately after transmitting the delimiter pattern, and the non-instigating end would change its rate immediately upon receipt of the delimiter pattern.

Figure 4:
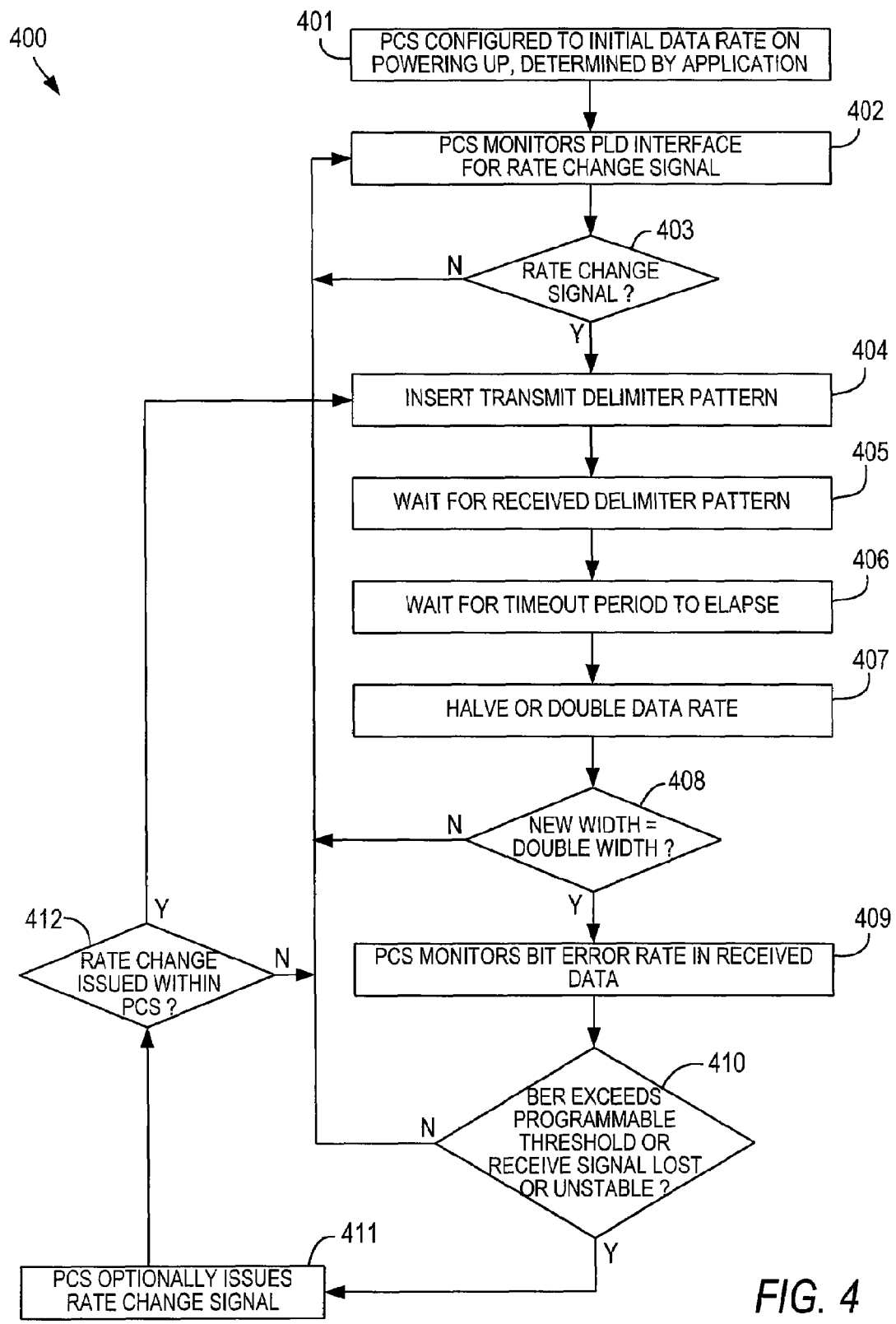
FIG. 4 is a flow diagram of the operation of an automatic speed negotiation module of the embodiment of FIG. 3.

FIG. 4 shows the preferred mode of operation 400 of automatic speed negotiation module 31 in an embodiment where the data rate may be increased as well as decreased, and where use of a delimiter pattern is optional. The process starts at step 401 where the PCS is powered up and configured to an initial data rate determined by the application for which it is being used, possibly under control of PLD core 32. Next, at step 402, the PCS (i.e., automatic speed negotiation module 31 of the PCS) monitors the PLD interface at 363 for a rate-change signal. At test 403, if there is no rate-change signal, the method loops back to step 402 until at step 403 there is a rate-change signal.

Once there is a rate-change signal at test 403, then at step 404, the delimiter pattern optionally is transmitted, at step 405 receipt of a delimiter pattern optionally is awaited, and then at step 406 passage of the delay period (timer 319) optionally is awaited to allow the PMA or other remote device to modify its own data rate, after which, at step 407 the PCS data rate preferably is doubled or halved, depending on its current state. In other words, in the embodiment diagrammed in FIG. 4, there are only two data rates and the rate can change in either direction. Thus, if a rate-change signal is generated when the rate is low, the rate is increased, and if the rate-change signal is generated when the rate is high, the rate is decreased.

Next, at test 408, the method tests to see if the new data path width (this embodiment changes the data rate by changing the data path width as discussed above) is the wider width, meaning that the data rate has been increased. If not, meaning that the data rate has been decreased, the method returns to step 402 and waits for a rate-change signal. If at test 408 the data path width is the wider width, signifying an increased data rate, then at step 409 and test 410, bit-error-rate monitor 314 is monitored for an increase in the error rate to unacceptable levels (this is not a concern when you only have two data rates and you have just decreased the data rate), and if there is no increase after a predetermined interval (which may vary by implementation), the method returns to step 402 and waits for a rate-change signal. If there is a bit-error-rate increase to unacceptable levels within that interval, then at step 411 bit-error-rate monitor 314 itself may cause generation of a rate-change signal. If test 412 determines that at step 411 no rate-change signal has been generated, then the method returns to step 402 and waits for a rate-change signal. If test 412 determines that at step 411a rate-change signal has been generated, then the method returns to step 404 to process the rate change.

Thus it is seen that a serial interface with a hardware speed negotiation module, which allows faster processing of data rate changes in response to error signal, has been provided. Implementing this feature on a per-channel basis optimizes system performance, enabling each individual channel to function at its own highest reliable data rate.

Figure 5:
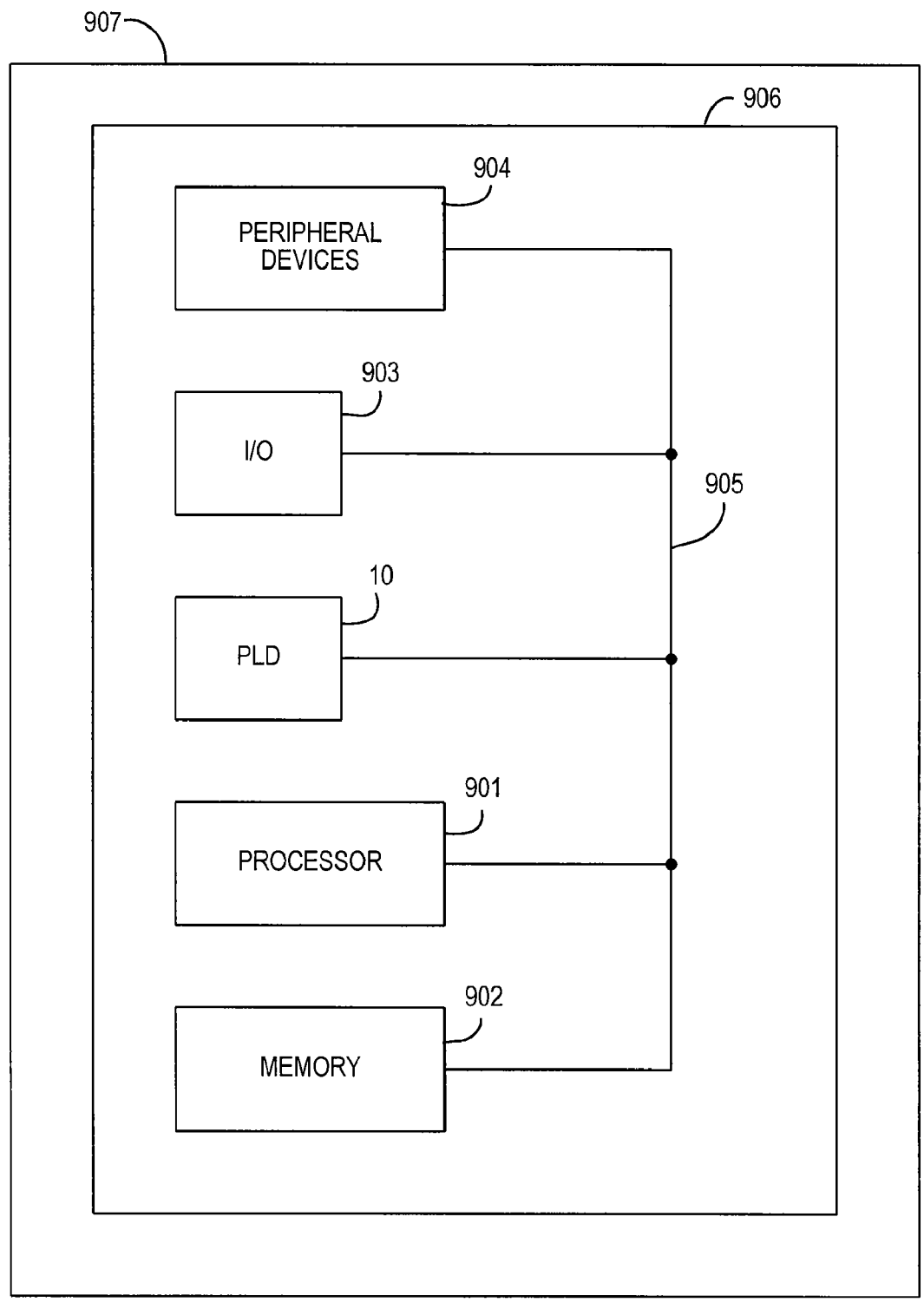
FIG. 5 is a simplified block diagram of an illustrative system employing a programmable logic device incorporating a serial interface in accordance with the present invention.

A PLD 10 incorporating interfaces 20 according to the present invention may be used in many kinds of electronic devices. One possible use is in a data processing system 900 shown in FIG. 5. Data processing system 900 may include one or more of the following components: a processor 901; memory 902; I/O circuitry 903; and peripheral devices 904. These components are coupled together by a system bus 905 and are populated on a circuit board 906 which is contained in an end-user system 907.

System 900 can be used in a wide variety of applications, such as computer networking, data networking, instrumentation, video processing, digital signal processing, or any other application where the advantage of using programmable or reprogrammable logic is desirable. PLD 10 can be used to perform a variety of different logic functions. For example, PLD 10 can be configured as a processor or controller that works in cooperation with processor 901. PLD 10 may also be used as an arbiter for arbitrating access to shared resources in system 900. In yet another example, PLD 10 can be configured as an interface between processor 901 and one of the other components in system 900. It should be noted that system 900 is only exemplary, and that the true scope and spirit of the invention should be indicated by the following claims.

Various technologies can be used to implement PLDs 10 as described above and incorporating this invention.

It will be understood that the foregoing is only illustrative of the principles of the invention, and that various modifications can be made by those skilled in the art without departing from the scope and spirit of the invention, and the present invention is limited only by the claims that follow.

What is claimed is:

1. A serial interface for use in a programmable logic device, said serial interface comprising:
   a transmitter portion programmably configurable to a plurality of data rates and having a transmitter data path width;
   a receiver portion programmably configurable to said plurality of data rates and having a receiver data path width; and
   an automatic speed negotiation module operatively connected to said transmitter portion and said receiver portion to configure said transmitter portion and said receiver portion for communication with a remote device at a single data rate that is a best available one of said plurality of data rates by adjusting said transmitter data path width and said receiver data path width.

2. The serial interface of claim 1 wherein said automatic speed negotiation module configures said transmitter portion and said receiver portion in response to a signal from another portion of said programmable logic device.

3. The serial interface of claim 2 wherein said automatic speed negotiation module comprises a timer to delay configuring of said transmitter portion and said receiver portion after receipt of said signal.

4. The serial interface of claim 2 wherein said signal is an error signal indicating a data error in at least one of said transmitter portion and said receiver portion.

5. The serial interface of claim 2 wherein:
said automatic speed negotiation module comprises a bit-error-rate monitor to monitor data in said receiver portion; and
said another portion of said programmable logic device receives output from said bit-error-rate monitor and generates said signal based on said output.

6. The serial interface of claim 2 wherein:
said transmitter portion is tri-stated for a predetermined duration during configuring of said transmitter portion and said receiver portion; and
said automatic speed negotiation module comprises a timer to time said predetermined duration.

7. The serial interface of claim 1 wherein said automatic speed negotiation module monitors said receiver portion and configures said transmitter portion and said receiver portion in response to results of said monitoring.

8. The serial interface of claim 7 wherein:
said automatic speed negotiation module comprises a bit-error-rate monitor to monitor data in said receiver portion; and
said automatic speed negotiation module configures said transmitter portion and said receiver portion in response to a signal from said bit-error-rate monitor.

9. The serial interface of claim 7 wherein:
said automatic speed negotiation module monitors data in said receiver portion for occurrence of a delimiter pattern; and
said automatic speed negotiation module configures said transmitter portion and said receiver portion in response to said occurrence of said delimiter pattern.

10. The serial interface of claim 9 wherein said automatic speed negotiation module comprises:
a pattern generator to generate said delimiter pattern; and
a comparator to compare said data in said receiver portion to said delimiter pattern.

11. The serial interface of claim 1 wherein:
said automatic speed negotiation module comprises a pattern generator to generate a delimiter pattern; and
said automatic speed negotiation module inserts said delimiter pattern into data in said transmitter portion prior to configuring said transmitter portion and said receiver portion.

12. A method for negotiating a data rate in a serial interface of a programmable logic device, said method comprising:
monitoring said serial interface for occurrence of one of (a) a rate change signal, and (b) a rate change instigation delimiter pattern;
on detection of said rate change signal, transmitting said rate change instigation delimiter pattern, and awaiting receipt of a rate change acknowledgment delimiter pattern;
on detection of said rate change instigation delimiter pattern, transmitting said rate change acknowledgment delimiter pattern; and
on occurrence of one of (a) receipt, and (b) transmission, of said rate change acknowledgment delimiter pattern, changing said data rate.

13. The method of claim 12 further comprising, after said occurrence of one of (a) receipt, and (b) transmission, of said rate change acknowledgment delimiter pattern, and before said changing said data rate, waiting for a predetermined time interval to elapse.

14. The method of claim 12 wherein:
said serial interface has a data path width; and
said changing comprises altering said data path width.

15. The method of claim 12 wherein said monitoring for occurrence of a rate change signal comprises monitoring for a rate change signal from a portion of said programmable logic device outside said serial interface.

16. The method of claim 12 wherein said monitoring for occurrence of a rate change signal comprises monitoring for a rate change signal from a component of said serial interface.

17. The method of claim 16 wherein said monitoring for occurrence of a rate change signal comprises monitoring for a rate change signal from a bit error rate monitor in said serial interface.

18. An automatic speed negotiation module for use in a serial interface of a programmable logic device, wherein said serial interface has a transmitter portion programmably configurable to a plurality of data rates and a receiver portion programmably configurable to said plurality of data rates, wherein:
said automatic speed negotiation module is operatively connected to said transmitter portion and said receiver portion to configure said transmitter portion and said receiver portion for communication with a remote device at a single data rate that is a best available one of said plurality of data rates, said automatic speed negotiation module comprising:
a rate-change signal generator responsive to an external signal to generate a rate-change signal;
a transmit-rate delimiter generator that generates a transmit-rate delimiter pattern;
a transmit-rate delimiter insertion unit responsive to said rate-change signal for causing said transmit-rate delimiter generator to insert said transmit-rate delimiter pattern into data transmitted by said transmitter portion;
a transmit-rate delimiter transmission signal generator responsive to said transmit-rate delimiter insertion unit for generating a delimiter-transmitted signal when said transmit-rate delimiter pattern has been inserted into said transmitted data;
a receive-rate delimiter generator that generates a receive-rate delimiter pattern;
a receive-rate delimiter comparator that compares data received by said receiver portion to said receive-rate delimiter pattern and generates a delimiter-received signal when said receive-rate delimiter pattern has been detected in said received data;
a receive-rate delimiter reception signal generator that generates a reception signal responsive to said delimiter-received signal; and
a timer for counting down a delay period beginning after occurrence of at least one of said reception signal and said delimiter-transmitted signal; wherein:
said transmitter portion and said receiver portion are configured after said delay period for communication at said single data rate.

19. The automatic speed negotiation module of claim 18 further comprising a bit-error-rate monitor that monitors said received data and, upon detection of error in said received data, generates said external signal.

20. The automatic speed negotiation module of claim 18 wherein said external signal is generated elsewhere in said programmable logic device.

21. The automatic speed negotiation module of claim 18 wherein said timer counts down said delay period beginning only after occurrence of both of said reception signal and said delimiter-transmitted signal.

* * * * *